(No Model.) 3 Sheets—Sheet 1.

D. P. TIPTON.
CURRY COMB.

No. 384,799. Patented June 19, 1888.

Witnesses,
Thos. W. Talbott.
George B. Pfeiffer.

Inventor,
D. P. Tipton.

N. PETERS, Photo-Lithographer, Washington, D. C.

(No Model.) 3 Sheets—Sheet 2.
D. P. TIPTON.
CURRY COMB.
No. 384,799. Patented June 19, 1888.
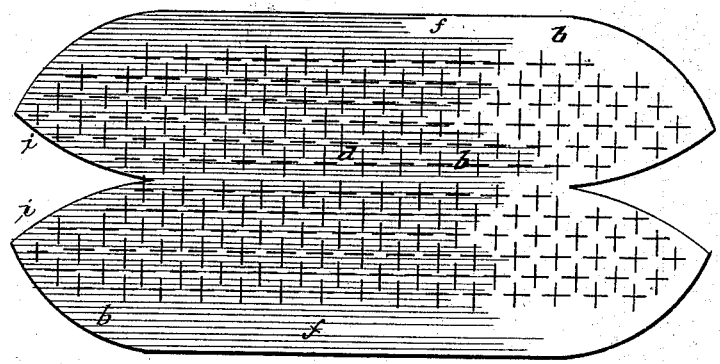
Fig. 4.
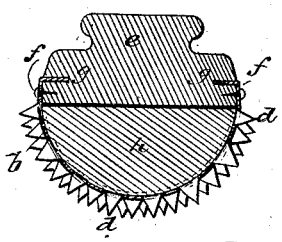
Fig. 5.
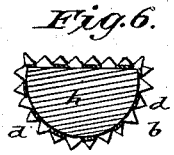
Fig. 6.
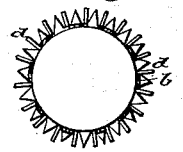
Fig. 7.
Fig. 8.
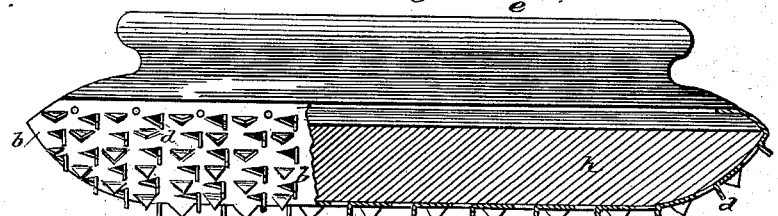
Fig. 9.
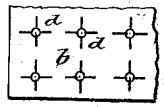
Fig. 10.
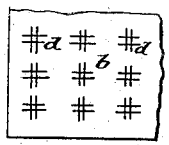
Fig. 11.
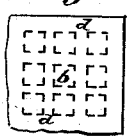
Fig. 12.
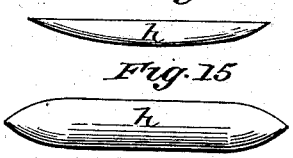
Fig. 14.
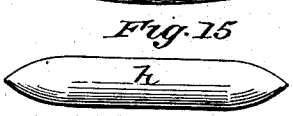
Fig. 15.
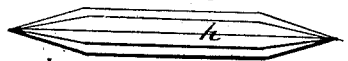
Fig. 16.
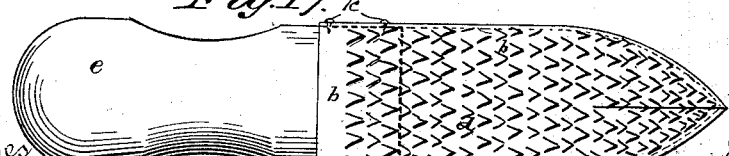
Fig. 17.
Fig. 13.
Witnesses
Thos. W. Talbott
George B. Pfeiffer
Inventor,
D. P. Tipton (No Model.) 3 Sheets—Sheet 3.

D. P. TIPTON.
CURRY COMB.

No. 384,799. Patented June 19, 1888.

WITNESSES:
Thos. W. Talbott
George B. Pfeiffer

INVENTOR,
D. P. Tipton

UNITED STATES PATENT OFFICE.

DIE P. TIPTON, OF BROWNVILLE, NEBRASKA.

CURRY-COMB.

SPECIFICATION forming part of Letters Patent No. 384,799, dated June 19, 1888.

Application filed March 26, 1888. Serial No. 268,545. (No model.)

*To all whom it may concern:*

Be it known that I, DIE P. TIPTON, a citizen of the United States, residing at Brownville, in the county of Nemaha and State of Nebraska, have invented a new and useful Improvement in Curry-Combs, of which the following is a specification.

My invention relates to curry-combs of an elongated cylindrical or equivalent form with a conical end or ends, and is an improvement upon the curry-comb described in my application Serial No. 252,608, filed October 17, 1887.

That which is claimed in said application Serial No. 252,608 is disclaimed in this.

The object of this invention is to form a curry-comb of cylindrical or equivalent form with a conical end or ends from a single blank or sheet of metal, the teeth thereof being formed by striking them up from the body-surface of said sheets or blanks, so that they are an integral part of the same.

By making the comb from a single sheet or blank a saving of material will be effected, and at the same time a strong and light structure will be produced. The form of the blank will depend entirely upon the configuration of the working-surface of the comb, as will clearly appear from the following description.

Reference is had to the accompanying drawings, forming part of this specification, wherein like reference-letters refer to like parts.

Figure 1:
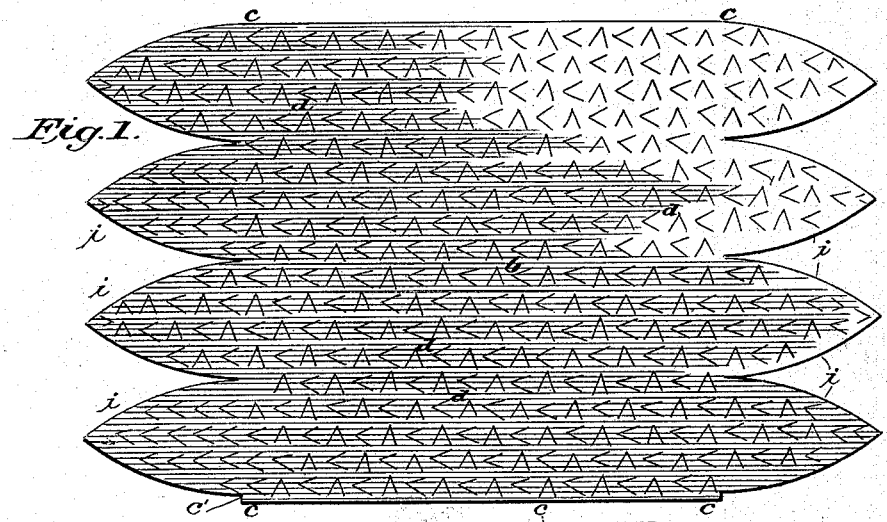
Figure 2:
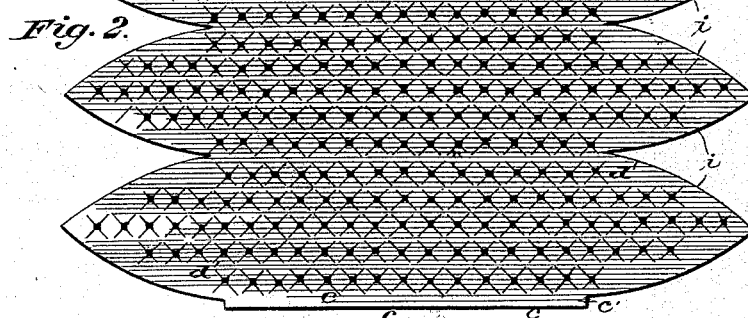
Figure 3:
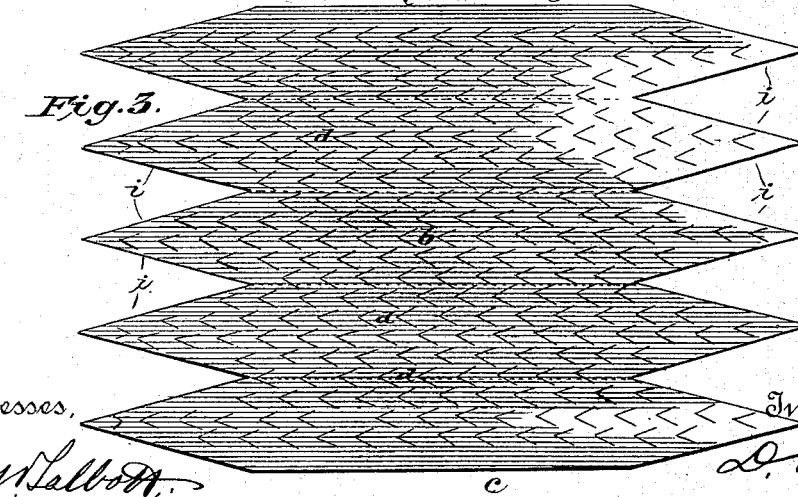
Figure 18:
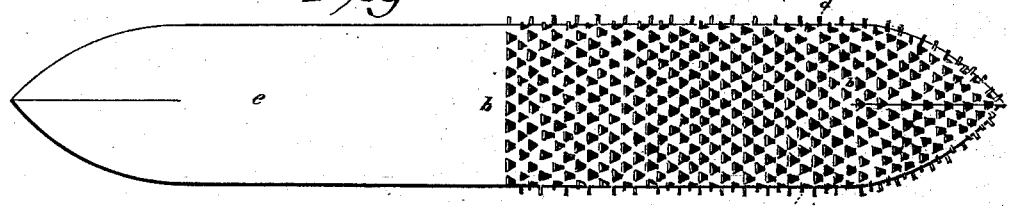
Figure 19:
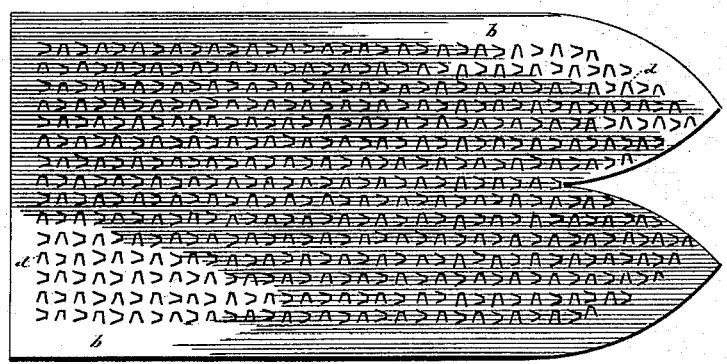
Figure 20:
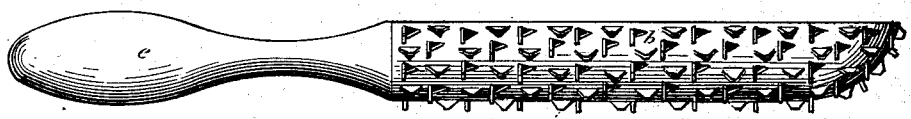

Figure 1 represents a blank from which a cylindrical comb is formed. Fig. 2 represents a blank from which a semi-cylindrical comb with a toothed flat side is formed. Fig. 3 represents a blank from which a polyhedral-shaped comb is formed. Fig. 4 represents a blank from which a comb with a semi-cylindrical working-surface and a handle upon the upper side thereof is formed. Fig. 5 is a cross-section of the semi-cylindrical comb, showing a handle on its upper side. Fig. 6 is a cross-section of the semi-cylindrical comb without a handle as formed from the blank shown in Fig. 2. Fig. 7 is a cross-section of the cylindrical comb with its former or core removed. Fig. 8 is a cross-section of the polyhedral comb, showing the core within. Fig. 9 is a part-perspective and part-sectional view of the semi-cylindrical comb with the handle at the upper side. Figs. 10, 11, and 12 show small portions of blanks, illustrating different styles of teeth. Fig. 13 shows the outline form of the bottom of the handle shown in Fig. 5. Fig. 14 shows a former to be used in the semi-cylindrical comb. Fig. 15 shows a former to be used in the cylindrical comb. Fig. 16 shows a former to be used in the polyhedral-shaped comb. Fig. 17 shows a cylindrical comb with a handle at one end. Fig. 18 shows a cylindrical comb formed from a blank, one end thereof being left smooth, without teeth, for the purpose of being used as a handle. Fig. 19 shows a blank from which is formed the working-surface of a semi-cylindrical comb with a handle at one end. Fig. 20 shows a semi-cylindrical comb with an end handle and a smooth upper side.

In the several figures, *b* are the blanks or plates, which may be cut or stamped from any appropriate sheet metal.

In Fig. 1 I have shown a blank which is to form a cylindrical comb, and this is done by bending said blank over a former or otherwise until its edges *c* meet or overlap and by securing them in any suitable manner. If desired, one edge may be extended for the purpose of overlapping and to provide means for securing them together, as shown at *c'*, Figs. 1 and 2. The tapering ends *i* are then pressed down until their sides and ends meet, thereby forming conical ends to the comb, and are then secured in position in any suitable manner—as by soldering, for instance.

The teeth *d* shown in Figs. 1, 2, 3, 4, 10, 11, 12, and 19 are represented as they appear before being struck up from the blanks. They may be saw-teeth, as shown in Figs. 1, 3, 4, and 12, or may be more or less rounded or flattened, as in Figs. 2, 10, 11, and 19. Those shown in Fig. 4 can be formed by cutting right-angle slits in the blank and then forcing up the teeth so formed, and those shown in Fig. 2 can be formed by cutting openings with four concave sides and then cutting right-angle slits through the corners of said openings and forcing the teeth up, as in the first case. Teeth shown in Fig. 10 could be formed by cutting circular openings and right-angle slits through them. Teeth shown in Fig. 11 could be formed by cutting parallel lines and then intersecting them at right angles with other parallel lines and striking up those portions of metal having parallel sides and flat tops.

Regarding the arrangement of the teeth they may be located in diagonal, parallel, or cross rows with reference to the length of the blank, or in any other desirable manner, as shown in the various drawings.

In Fig. 2 I have shown a blank from which is formed a semi-cylindrical comb. In this instance about one-third of the blank $d'$ is left flat, and the outer edge, $c'$, of this portion is secured to the other edge, $c$, of the blank, the curved surface constituting about two-thirds of the whole surface. The conical ends are formed similarly to those on the cylindrical comb above described. If desired, the flat surface of the semi-cylindrical comb may be left smooth without teeth, as shown in Fig. 20.

A semi-cylindrical comb with a handle on its side is formed by bending the blank shown in Fig. 4 and then securing its edges $f$ to the handle $e$, Figs. 5 and 9, by tacks or screws, as shown in said figures, or by bending the edges of the blank in such a manner that they will fit into grooves $g$, Fig. 5, along the side of the handle. When the comb is made with but one conical end, a handle may be attached to the other end by snugly fitting said handle into said end and securing it therein by suitable means, as shown in Fig. 17, where the heavy dotted lines show the handle inserted into the blank a short distance, and the light dotted lines show it inserted into the blank clear to the point of the conical end, in which latter case one end of the handle acts as a former.

In Figs. 5, 6, 8, and 9 I have shown the formers or cores over which the blanks are bent or formed remaining within the blanks; but they may be removed, as shown in Fig. 7.

The blank used in the polyhedral comb may be creased along the dotted lines (shown in Fig. 3) to facilitate bending it.

As is clearly indicated in Figs. 1, 2, 3, 4, and 19, I provide for the formation of the conical ends by cutting out wedge-shaped or triangular gores from the ends of the blanks.

This comb being identical in form with the comb described in my application No. 252,608, filed October 17, 1887, is free from corners, edges, and horizontally-extended surfaces, and is therefore capable of rotary operation and perfectly adapted for use about the elbows between the front legs at the hock-joint, between the pastern-joint and the hoof, and upon all those portions of an animal's body where the surface is irregular.

Having thus described my invention, what I claim, and desire to secure by Letters Patent, is—

1. A curry-comb of cylindrical or equivalent form made from a metal blank, the teeth thereof being struck up from the body of said blank, substantially as set forth.

2. A curry-comb of cylindrical or equivalent form formed from a metal blank having struck-up teeth and provided with a handle extending from one end thereof, substantially as set forth.

3. A curry-comb of cylindrical or equivalent form formed from a blank of metal having teeth struck up from its body, the end or ends of said blank being gored or cut away, whereby the remaining portions, when pressed together, form a conical end or ends, substantially as set forth.

4. A curry-comb of cylindrical or equivalent form, consisting of an interior former and a blank having struck-up teeth thereon, substantially as set forth.

DIE P. TIPTON.

Witnesses:
R. W. TALBOTT,
THOS. M. TALBOTT.